US008285140B2

(12) United States Patent
McCracken et al.

(10) Patent No.: US 8,285,140 B2
(45) Date of Patent: *Oct. 9, 2012

(54) SHARED-SOURCE-ROW OPTICAL DATA CHANNEL ORGANIZATION FOR A SWITCHED ARBITRATED ON-CHIP OPTICAL NETWORK

(75) Inventors: Michael Oliver McCracken, Austin, TX (US); Pranay Koka, Austin, TX (US); Herbert Dewitt Schwetman, Jr., Austin, TX (US); Xuezhe Zheng, San Diego, CA (US); Ashok Krishnamoorthy, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/723,591

(22) Filed: Mar. 12, 2010

(65) Prior Publication Data
US 2011/0200332 A1    Aug. 18, 2011

Related U.S. Application Data

(63) Continuation-in-part of application No. 12/707,554, filed on Feb. 17, 2010.

(51) Int. Cl.
*H04J 14/00* (2006.01)
(52) U.S. Cl. ............... 398/45; 398/46; 398/50; 398/51
(58) Field of Classification Search .............. 398/12, 398/19, 45, 46, 48–54, 56, 57, 98
See application file for complete search history.

(56) References Cited

U.S. PATENT DOCUMENTS

| 4,580,872 | A | 4/1986 | Bhatt et al. |
|---|---|---|---|
| 4,809,264 | A | 2/1989 | Abraham et al. |
| 5,541,914 | A | 7/1996 | Krishnamoorthy et al. |
| 5,602,663 | A | 2/1997 | Hamaguchi et al. |
| 5,742,585 | A | 4/1998 | Yamamoto et al. |
| 5,943,150 | A * | 8/1999 | Deri et al. ................. 398/89 |
| 6,021,263 | A | 2/2000 | Kujoory et al. |
| 6,289,021 | B1 * | 9/2001 | Hesse ..................... 370/409 |
| 6,633,542 | B1 | 10/2003 | Natanson et al. |
| 6,665,495 | B1 | 12/2003 | Miles et al. |
| 6,873,796 | B1 | 3/2005 | Nakahira |

(Continued)

OTHER PUBLICATIONS

Vantrease, D., et al., "Corona:System Implications for Emerging Nanophotonic Technology", International Symposium on Computer Architecture, IEEE, Jun. 2008, 12 pages.

(Continued)

*Primary Examiner* — Dalzid Singh
(74) *Attorney, Agent, or Firm* — Osha Liang LLP

(57) ABSTRACT

A system including first and second sending nodes, a horizontal optical data link (ODL) having optical signals propagating in opposite directions in first and second waveguide segments, a vertical ODL having optical signals propagating in the same direction throughout third and fourth waveguide segments, a first optical output switch operatively connecting the first sending node and the first waveguide segment and configured to switch first data item onto the first waveguide segment during a first timeslot, a second optical output switch operatively connecting the second sending node and the second waveguide segment and configured to switch second data item onto the second waveguide segment during a second timeslot, and an optical coupler pair operatively connecting the first and second waveguide segments to the third and fourth waveguide segments, respectively, and redirecting the first and the second data items from the horizontal to the vertical ODL.

20 Claims, 5 Drawing Sheets

U.S. PATENT DOCUMENTS

| | | | |
|---|---|---|---|
| 7,403,473 B1 | 7/2008 | Mehrvar et al. | |
| 7,804,504 B1 * | 9/2010 | Agarwal | 345/505 |
| 2003/0214962 A1 | 11/2003 | Allaye-Chan et al. | |
| 2004/0037558 A1 | 2/2004 | Beshai | |
| 2009/0046572 A1 | 2/2009 | Leung | |
| 2011/0103799 A1 * | 5/2011 | Shacham et al. | 398/115 |

OTHER PUBLICATIONS

Wang, H., et al., "Nanophotonic Optical Interconnection Network Architecture for On-Chip and Off-Chip Communications", OFC/NFOEC, Feb. 2008, IEEE, 3 pages.

Krishnamoorthy, A. V., Ho, R., Zheng, X., Schwetman, H., Lexau, J., Koka, P., Li, G., Shubin I., Cunningham, J. E., "Computer Systems Based on Silicon Photonic Interconnects", Proceedings of the IEEE, Vul. 97, No. 7, Jul. 2009.

Chae, C., Wong, E., and Tucker, R. S., "Optical CSMA/CD Media Access Scheme for Ethernet Over Passive Optical Network", IEEE Photonic Technology Letters, May 2002, 3 pages.

Desai, B. N., "An Optical Implementation of a Packet-Based (Ethernet) MAC in a WDM Passive Optival Network Overlay", Mar. 2001, 3 pages.

Qin, X., and Yang, Y., "Nonblocking WDM Switching Networks with Full and Limited Wavelength Conversion", IEEE Transactions on Communications, Dec. 2002, 10 pages.

Shacham, A., Bergman, K., and Carloni, L. P., "On the Design of a Photonic Network-on-Chip", First International Symposium on Networks-on-Chip, May 2007, 12 pages.

Yang, Y., and Wang, J., "Designing WDM Optical Interconnects with Full Connectivity by Using Limited Wavelength Conversion", IEEE Transactions on Computers, Dec. 2004, 10 pages.

Batten, C., et al., "Building Manycore Processor-to-DRAM Networks with Monolithic Silicon Photonics", Proceedings of the 16th Symposium on High Performance Interconnects (HOTI-16) Aug. 2008, 10 pages.

* cited by examiner

SHARED-SOURCE-ROW OPTICAL DATA CHANNEL ORGANIZATION FOR A SWITCHED ARBITRATED ON-CHIP OPTICAL NETWORK

CROSS-REFERENCE TO RELATED APPLICATIONS

This application is a continuation-in-part (CIP) of U.S. patent application Ser. No. 12/707,554, filed on Feb. 17, 2010, and entitled: "Data Channel Organization For A Switched Arbitrated On-Chip Optical Network." Accordingly, this application claims benefit of U.S. patent application Ser. No. 12/707,554 under 35 U.S.C. §120. U.S. patent application Ser. No. 12/707,554 is incorporated herein by reference.

This application is related to U.S. patent application Ser. No. 12/688,749, filed on Jan. 15, 2010, and entitled: "Time Division Multiplexing Based Arbitration For Shared Optical Links."Accordingly, U.S. patent application Ser. No. 12/688,749 is incorporated herein by reference.

This application is related to U.S. patent application Ser. No. 12/610,124, filed on Oct. 30, 2009, and entitled: "Two-Phase Arbitration Mechanism for Shared Optical Links." Accordingly, U.S. patent application Ser. No. 12/610,124 is incorporated herein by reference.

STATEMENT REGARDING FEDERALLY SPONSORED RESEARCH OR DEVELOPMENT

This invention was made with Government Support under Agreement No. HR0011-08-9-0001 awarded by DARPA. The Government has certain rights in the invention.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place a different set of constraints on designers. For example, because each processor may be working on an independent task, more requests to memory, or other processors, may need to be issued. It may also be necessary to share information among the processors. Accordingly, the input/output ("I/O") bandwidth requirements for a system with multiple processors may be much higher than for a single processor system.

SUMMARY OF THE INVENTION

In general, in one aspect, the invention relates to a system for optical data communication. The system includes a first sending node having a first data item for transmission to a receiving node during a first timeslot, a second sending node having a second data item for transmission to the receiving node during a second timeslot, wherein the first and second sending nodes are located within a node row of a node array, a horizontal optical data link (ODL) comprising a first waveguide segment and a second waveguide segment, wherein optical signals propagate in opposite directions in the first and second waveguide segments, a vertical ODL coupled to the receiving node and comprising a third waveguide segment and a fourth waveguide segment, wherein the optical signals propagate in same directions throughout the third and fourth waveguide segments, a first optical output switch operatively connecting the first sending node and the first waveguide segment and configured to switch the first data item onto the first waveguide segment during the first timeslot, a second optical output switch operatively connecting the second sending node and the second waveguide segment and configured to switch the second data item onto the second waveguide segment during the second timeslot, and an optical coupler pair operatively connecting the first and second waveguide segments to the third and fourth waveguide segments, respectively, wherein the optical coupler pair redirects the first data item and the second data item from the horizontal ODL to the vertical ODL.

In general, in one aspect, the invention relates to a method for optical data communication. The method steps include allocating a first timeslot to a first sending node in an arbitration domain and a second timeslot to a second sending node in an arbitration domain, switching, using a first output switch associated with the first sending node, a first data item from the first sending node onto a first waveguide segment of a first optical data link (ODL) during the first timeslot, redirecting, using a first optical coupler pair, the first data item from the first waveguide segment of the first ODL to a first waveguide segment of a second ODL operatively coupled to a receiving node, receiving the first data item from the first waveguide segment of the second ODL to the receiving node during the first timeslot, and deactivating the first output switch for the second timeslot, wherein optical signals propagate in opposite directions in the first waveguide segment and a second waveguide segment of the first ODL, and wherein optical signals propagate in same direction throughout the first waveguide segment and a second waveguide segment of the second ODL.

In general, in one aspect, the invention relates to a system for optical data communication. The system includes a first sending node having a first data item for transmission to a receiving node during a first timeslot, a second sending node having a second data item for transmission to the receiving node during a second timeslot, wherein the first and second sending nodes are located within a node row of a node array, a horizontal optical data link (ODL) operatively coupled to a vertical ODL, wherein the vertical ODL is operatively coupled to a receiving node, a first optical output switch operatively connecting the first sending node and the horizontal ODL and configured to switch the first data item onto the horizontal ODL during the first timeslot, a second optical output switch operatively connecting the second sending node and the horizontal ODL and configured to switch the second data item onto the horizontal ODL during the second timeslot, and an optical coupler operatively connecting the horizontal ODL and the vertical ODL, wherein the optical coupler redirects the first data item and the second data item from the horizontal ODL to the vertical ODL.

Other aspects of the invention will be apparent from the following description and the appended claims.

DETAILED DESCRIPTION

Figure 1:
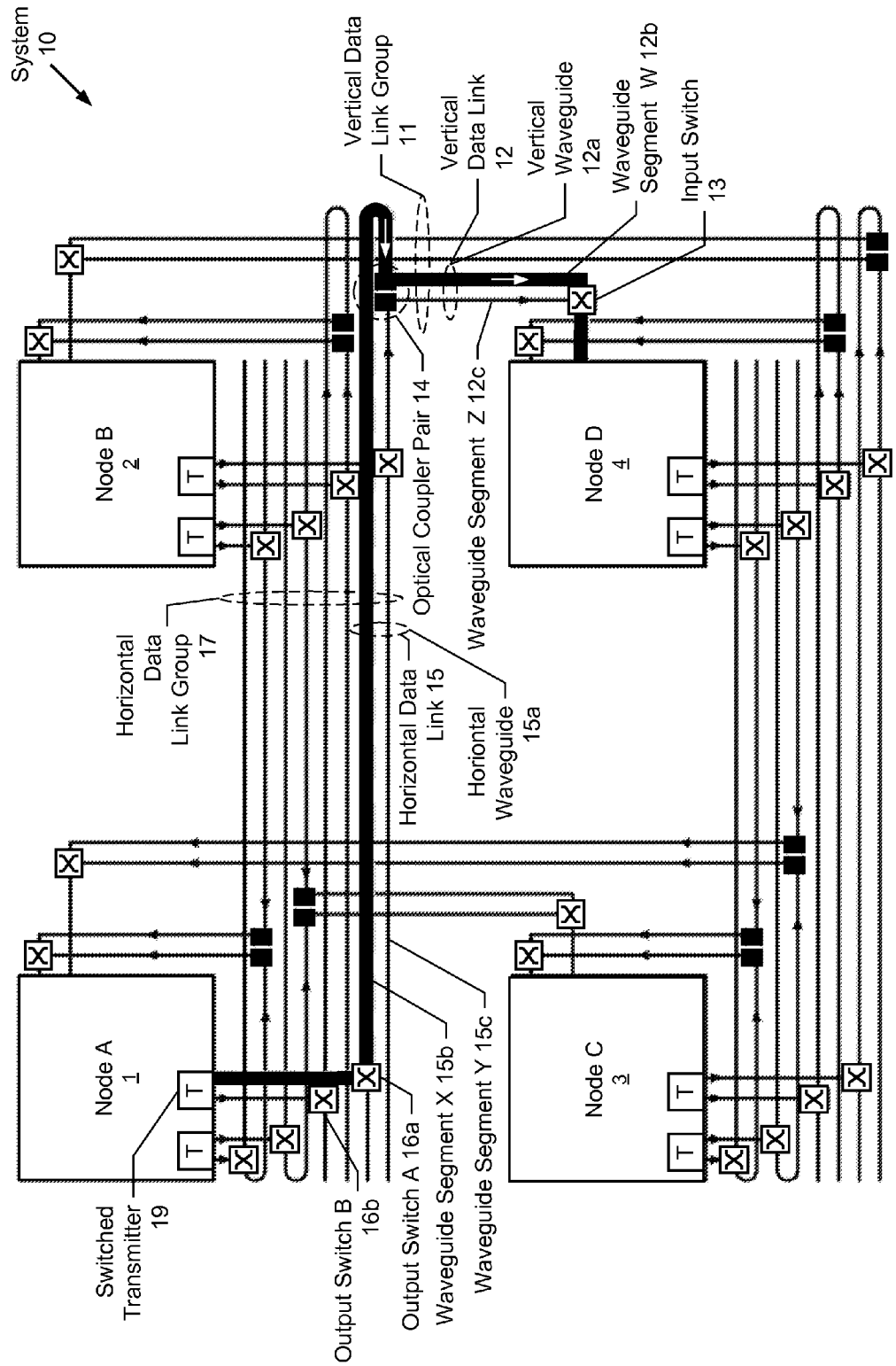
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for data communication between multiple nodes in a node array (e.g., a grid). Between each transmitting (i.e., sending node) and receiving node there is a data path connecting the two nodes. In one or more embodiments of the invention, the data paths are implemented using optical links (i.e., optical data links). One or more segments of a data path may intersect with other data paths. The multiple data paths that intersect form an optical data channel. Accordingly, an optical data channel connects a group of nodes configured to send data items (i.e., sending nodes) with a set of receiving nodes using intersecting data paths. The set of receiving nodes may correspond to a single node or multiple nodes.

In general, as an optical data channel includes multiple data paths that intersect, arbitration is required to determine which of the sending nodes is entitled to send a data item at a given time (i.e., during a given timeslot). Accordingly, the sending nodes, the optical data channel, and the set of receiving nodes may be referred to as an arbitration domain. In other words, an arbitration domain includes a group of nodes that require arbitration to send data to at least one receiving node. Arbitration domains having the same sending nodes but different receiving nodes may be identified as different arbitration domains. An array of nodes may have any number of arbitration domains. Arbitration domains are further discussed below in reference to FIG. 1 and FIG. 2.

In one or more embodiments of the invention, each timeslot is allocated exclusively to one sending node within the arbitration domain. All timeslots may be of the same duration. Alternatively, the timeslots may be of different durations. In one or more embodiments, the series of timeslots is controlled by a common timeslot clock shared among nodes in the arbitration domain. During each timeslot, only the node exclusively allocated to the present timeslot is allowed to send data to a receiving node using the optical data channel. The allocation of such timeslots is based on arbitration amongst the sending nodes in the arbitration domain.

In general, more details regarding arbitration and arbitration domains may be found in U.S. patent application Ser. No. 12/688,749, filed on Jan. 15, 2010, and entitled: "Time Division Multiplexing Based Arbitration For Shared Optical Links" (hereinafter '749 patent application); and U.S. patent application Ser. No. 12/610,124, filed on Oct. 30, 2009, and entitled: "Two-Phase Arbitration Mechanism for Shared Optical Links" (hereinafter '124 patent application). Both '749 and '124 patent applications are incorporated herein by reference.

FIG. 1 shows a system (10) in accordance with one or more embodiments of the invention. Those skilled in the art, having the benefit of this detailed description, will appreciate that the components shown in FIG. 1 may differ among embodiments of the invention, and that one or more of the components may be optional. In one or more embodiments of the invention, components shown in FIG. 1 may be omitted, repeated, supplemented, and/or otherwise modified from those shown in FIG. 1. Accordingly, the specific arrangement of components shown in FIG. 1 should not be construed as limiting the scope of the invention.

As shown in FIG. 1, the system (10) includes multiple nodes (e.g., Node A (1)-Node D (4)) and an optical data network interconnecting nodes in the system (10). Although not specifically shown, an optical arbitration network is also included in the system (10). As noted above, details of an example optical arbitration network that may be used in the system (10) are described in the incorporated '749 and '124 patent applications.

In one or more embodiments of the invention, the system (10) corresponds to a macro-chip architecture based on optical data communication. The macro-chip architecture may include a silicon photonic optical network. For example, the silicon photonic optical network may be a switched optical network that uses a 1×2 broadband optical switching elements. Specifically, the optical data links (e.g., Vertical Data Link Group (11), Horizontal Data Link Group (17)) in the silicon photonic optical network are shared between nodes (e.g., Node A (1)-Node D (4)) disposed on the macro-chip by dynamically switching the optical data links between different sources (i.e., sending nodes) and destinations (i.e., receiving nodes) in the macro-chip. In one or more embodiments of the invention, the macro-chip is essentially the same as the macro-chip discussed in the document entitled: "Computer Systems Based on Silicon Photon Interconnects" by Krishnamoorthy, A. V. et al., and published in the Proceedings of the IEEE, Vol. 97, No. 7, July 2009, which is hereby incorporated by reference in its entirety.

In one or more embodiments of the invention, each of the nodes (e.g., Node A (1)-Node D (4)) in the system (10) may correspond to a die (e.g., semiconductor die). In one or more embodiments of the invention, each die includes one or more processors and/or one or more cache memories. Further, all nodes (e.g., Node A (1)-Node D (4)), may be disposed on a single chip (e.g., a macro-chip) as part of a larger mesh structure.

As discussed above, the nodes (e.g., Node A (1)-Node D (4)) are operatively coupled using an optical data network. The optical data network includes shared optical data link groups (i.e., Vertical Data Link Group (11), Horizontal Data Link Group (17)) for the transmission of data. An optical data link group is a collection of optical data links. For example, the Vertical Data Link Group (11) includes the vertical data link (12). The Horizontal Data Link Group (17) includes the horizontal data link (15).

In one or more embodiments of the invention, the nodes (e.g., Node A (1)-Node D (4)) connect to the data network via input switches and output switches. Although not specifically shown, each of the nodes (e.g., Node A (1)-Node D (4)) include unidirectional input ports and output ports for the connections. For example, the Node A (1) is coupled to the horizontal data link (15) via the output switch (16). The Node D (4) is coupled to the vertical data link (12) via the input switch (13). Thus, the Node A (1) sends data via the output switch A (16a) and Node D (4) receives data via the input switch (13).

Although not specifically shown in FIG. 1, a row of nodes may be referred to as a node row. For example, node A (1) and node B (2) form node row 0. Likewise, node C (3) and node D (4) form node row 1. A column of nodes may be referred to as a node column. For example, node A (1) and node C (3) form node column 0. Likewise, node B (2) and node D (4) form node column 1. In this context, the horizontal data link group (17) and the horizontal data link (15) are associated with the node row 0, while the vertical data link group (11) and the vertical data link (12) are associated with the node column 1.

A waveguide is a medium for the transmission of optical signals carrying/representing data. The wavelength of each optical signal may be selected by the sender of the data (i.e., sending node). Data carried/represented by the optical signals travels from one node to another node along the waveguides. In one or more embodiments of the invention, each data link includes only one waveguide. For example, the vertical data link (12) includes the vertical waveguide (12a), while the horizontal data link (15) includes the horizontal waveguide (15a). Alternatively, each data link may include multiple waveguides.

Generally speaking, during propagation along a data path, an optical signal traverses (i.e., hops) one or more optical switches. Each switch hop along the data path causes a loss of optical signal strength (e.g., a 1 dB loss, a 3 dB loss, etc.). In one or more embodiments of the invention, each waveguide is implemented as two waveguide segments to minimize the number of optical switches traversed by an optical signal. Within a node row, a subset of the sending nodes (e.g., half the sending nodes of the node row) are operatively connected to one segment of the waveguide, while the remaining sending nodes in the node row are operatively connected to the other segment of the waveguide. For example, the horizontal waveguide (15a) is implemented as waveguide segment X (15b) and waveguide segment Y (15c). Even though the node A (1) and the node B (2) are located within the same node row, the node A (1) is connected to the waveguide segment X (15b), while the node B (2) is connected to the waveguide segment Y (15c). As also shown in FIG. 1, the direction of propagation in the waveguide segment X (15b) is opposite the direction of propagation in waveguide segment Y (15c).

In one or more embodiments, each vertical waveguide is implemented as two waveguide segments. For example, the vertical waveguide (12a) is implemented as the waveguide segment W (12b) and the waveguide segment Z (12c). As shown in FIG. 1, the direction of propagation in the waveguide segment W (12b) is the same as the direction of propagation in the waveguide segment Z (12c). The waveguide segment W (12b) and the waveguide segment Z (12c) are operatively connected to the waveguide segment X (15b) and the waveguide segment Y (15c), respectively, using individual optical couplers (i.e., Optical Coupler Pair (14)). Those skilled in the art, having the benefit of this detailed description, will appreciate that an optical coupler is configured to redirect optical signals propagating on one data waveguide to another data waveguide. For example, one optical coupler of the optical coupler pair (14) is configured to redirect optical signals propagating on the waveguide segment X (15b) to the waveguide segment W (12b).

In one or more embodiments of the invention, a horizontal waveguide (possibly implemented with multiple waveguide segments), a vertical waveguide (possible implemented with multiple waveguide segments), and an optical coupler pair connecting said horizontal waveguide and said vertical waveguide correspond to an optical data channel. As shown in the legend (99), optical coupler pairs are designated in FIG. 1 by a pair of solid black rectangles.

In one or more embodiment of the invention, an input switch is a broadband switch that operatively connects a receiving node with the two waveguide segments of a vertical waveguide. One of the two waveguide segments is selected by activating the input switch. The other waveguide segment is selected by deactivating the input switch. Accordingly, the input switch must be involved in arbitration (discussed below). For example, the input switch (13) operatively connects the node D (4) with the waveguide segment W (12b) and the waveguide segment Z (12c). When the input switch (13) is activated (i.e., turned on), the input switch (13) switches optical signals of all wavelengths from the waveguide segment Z (12c) to the input of the node D (4). When the input switch (13) is deactivated (i.e., turned off), optical signals of all wavelengths propagating in the waveguide segment W (12b) are passed to the node D (4). Similarly, an output switch is configured to transmit (i.e., switch) a data item generated/provided by a sending node (e.g., node A (1)) to a waveguide segment. For example, the output switch A (16a) is configured to transmit (i.e., switch) a data item generated/provided by the node A (1) to the waveguide segment X (15b). In FIG. 1, the optical data path between the node A (1) and the node D (4) is denoted by the thick black line.

In one or more embodiments of the invention, each sending node includes a switched transmitter to drive multiple output switches. Specifically, the switched transmitter is used to transmit data items destined for receiving nodes in the same node column. Accordingly, each sending node may have one switched transmitter for each node column. For example, the node A (1) includes the switched transmitter (19) for transmitting data items to receiving nodes in node column 1. As shown in FIG. 1, the switched transmitter (19) also drives multiple output switches (i.e., Output Switch A (16a), Output Switch B (16b)). The switched transmitters effectively reduce the number of transmitters in the optical data network. In one or more embodiments of the invention, a sending node may simultaneously transmit two data items providing the data items are destined for receiving nodes in different node columns. As shown in the legend (99), switched transmitters are designated in FIG. 1 by a square box marked "T". More details of the switched transmitter (e.g., switched transmitter (19)) are described in reference to FIG. 3 below.

In one or more embodiments of the invention, multiple arbitration domains exist within the architecture of the system (10). As shown in FIG. 1, each receiving node is connected to each node row using a dedicated horizontal/vertical waveguide pair. For example, the node D (4), as a receiver node, is connected to the node row 0 using the horizontal waveguide (15a) and the vertical waveguide (12a). Accordingly, each node row/receiving node pair corresponds to an arbitration domain. Within an arbitration domain, the nodes of the node row are the sending nodes. Moreover, the sending nodes of the arbitration domain must arbitrate for timeslots to communicate with the single receiving node of the arbitration domain. For example, the node A (1) and the node B (2) must arbitrate for timeslots to send data items to the node C (3). Similarly, the node A (1) and the node B (2) must arbitrate for timeslots to send data items to the node D (4). As yet another example, the node C (3) and the node D (4) must arbitrate for timeslots to send data items to the node B (2).

In one or more embodiments of the invention, the sending node allocated the timeslot (i.e., the winning node of the arbitration) activates the output switch feeding a horizontal waveguide segment, while the receiving node controls the input switch to receive optical data from a vertical waveguide segment connected to said horizontal waveguide segment. When the timeslot is complete or when only a predetermined amount of time remains in the timeslot, the mentioned output switch is deactivated. For example, consider the arbitration domain including the node A (1), the node B (2), and the receiving node D (4). Further, assume the current timeslot is allocated to the node A (1). The node A (1) activates the output switch A (16a) for the timeslot feeding the waveguide segment X (15b). For at least a portion of the timeslot, the input switch (13) is set by the node D (4) to switch the optical signals propagating on the waveguide segment W (12b), which is operatively connected to the waveguide segment X (15b) using the optical coupler pair (14), to the node D (4).

In one or more embodiments of the invention, the architecture of the system (10) only requires arbitration when two sending nodes within the same node row have data for transmission to the same receiving node. In other words, arbitration is not required when two sending nodes within the same node row have data for transmission to two separate receiving nodes. Further, arbitration is not required between two sending nodes located in different node rows.

In one or more embodiments of the invention, a sending node may send multiple data items simultaneously (i.e., during a single timeslot) to receiving nodes in different node columns. However, because of the configuration of the switched transmitters within the sending node, contention may exist when the sending node has multiple data items to send multiple receiving nodes in a single node column. Accordingly, multiple timeslots may be allocated to the sending node in order to send the multiple data items to the multiple receiving nodes in the single node column.

Although FIG. 1 shows a system having two node rows and two node columns, more or fewer node rows and/or node columns may be used without departing from the scope of the invention. In one or more embodiments of the invention, the number of node rows is equal to the number of node columns. In one or more embodiments of the invention, increases in the number of node rows and node columns may be achieved by adding additional data links, input switches, and output switches.

For example, the discussion above applies generally to an N*M array having N node rows and M node columns. Said in other words, the system (10) may have any number of nodes (e.g., 4 nodes, 64 nodes, 10000 nodes, etc.). In an N*M array, there are N*M horizontal optical data links associated with each node row resulting in total of N*N*M horizontal optical data links in the N*M array. Further, in an N*M array, there are N*N vertical optical data links associated with each node column resulting in total of N*N*M vertical optical links in the N*M array.

Figure 2:
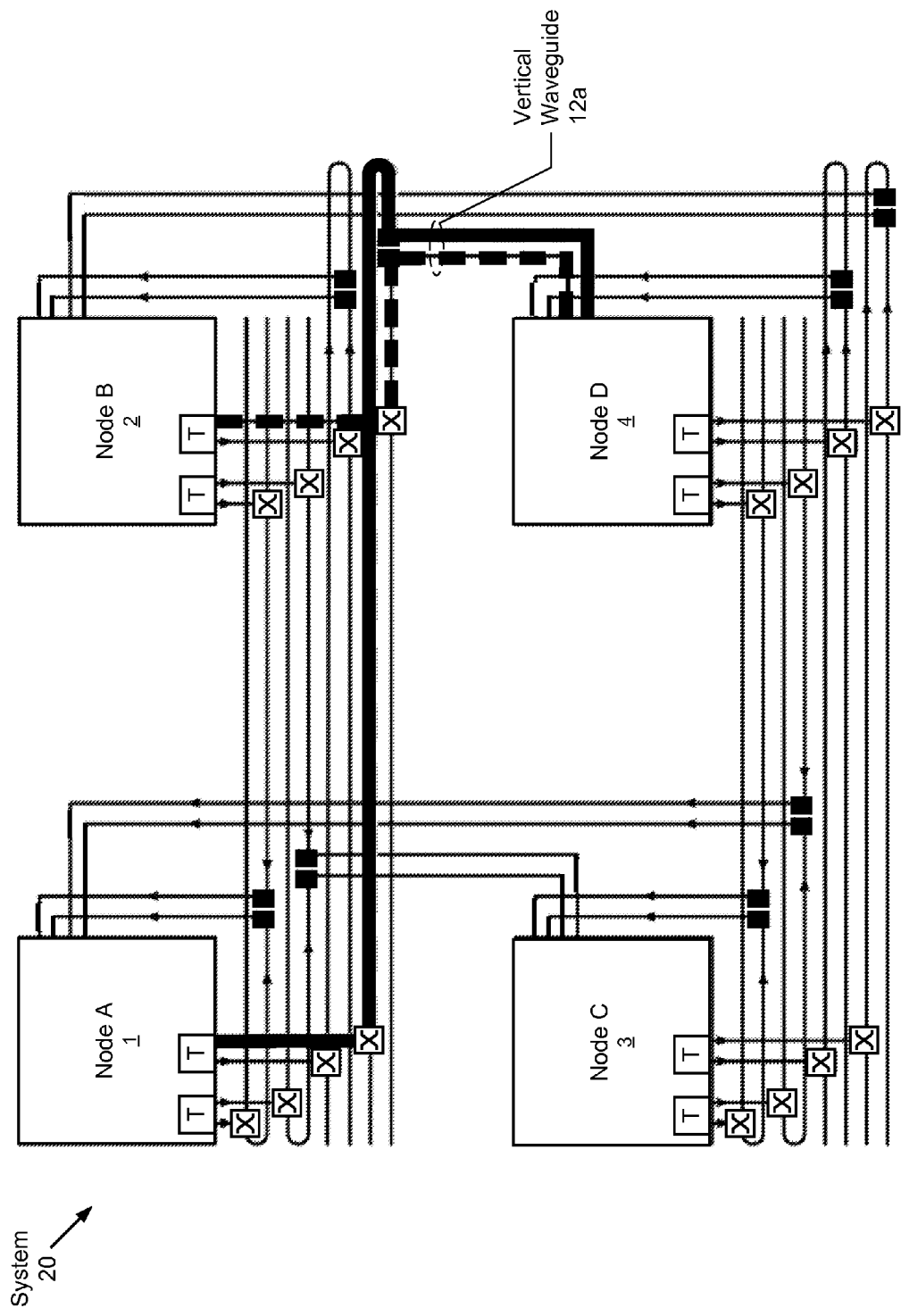
FIG. 2 shows a system in accordance with one or more embodiments of the invention.

FIG. 2 shows a system (20) in accordance with one or more embodiments of the invention. Those skilled in the art, having the benefit of this detailed description, will appreciate the components shown in FIG. 2 may differ among embodiments of the invention, and that one or more of the components may be optional. In one or more embodiments of the invention, components shown in FIG. 2 may be omitted, repeated, supplemented, and/or otherwise modified from those shown in FIG. 2. Accordingly, the specific arrangement of components shown in FIG. 2 should not be construed as limiting the scope of the invention.

As shown in FIG. 2, the system (20) includes essentially the same nodes, horizontal and vertical data link groups, horizontal and vertical waveguides, waveguide segments, output switches, optical coupler pairs, and optical arbitration network as those discussed above in reference to FIG. 1. Further, the architecture of the system (20) is essentially the same as the architecture of the system (10), with the exception that both waveguide segments of a vertical waveguide feed directly into the corresponding receiving node (i.e., there is no input switch separating the receiving node and the two waveguide segments). Accordingly, in comparison to the system (10), each receiving node in the system (20) is equipped with an extra optical receiver per incoming vertical waveguide.

In one or more embodiments of the invention, the use of additional optical receivers within each receiving node removes the need for the external input switch, and thus, removes the need to inform the external input switch regarding arbitration decisions. Accordingly, arbitration is only required for sending nodes operatively connected to the same waveguide segment. In other words, each horizontal waveguide segment/receiving node pair corresponds to an arbitration domain. The sending node wining the arbitration for a timeslot activates the output switch to feed the horizontal waveguide segment. When the timeslot is complete or when only a predetermined amount of time remains in the timeslot, the mentioned output switch is deactivated.

As discussed above, the architecture of the system (20) only requires arbitration when two sending nodes are connected to the same waveguide segment in a node row and have data items for transmission to the same receiving node. In other words, arbitration is not required when two sending nodes within the same node row have data for transmission to two separate receiving nodes, regardless of the node column(s) in which the two separate receiving nodes are located. Further, arbitration is not required between two sending nodes having data items for transmission to the same receiving node but connected to different waveguide segments in a node row. For example, node A (1) and node B (2) may send data items to node D (4) during the same timeslot using data paths denoted by the thick black line and the thick dashed black line in FIG. 2.

Figure 3B:
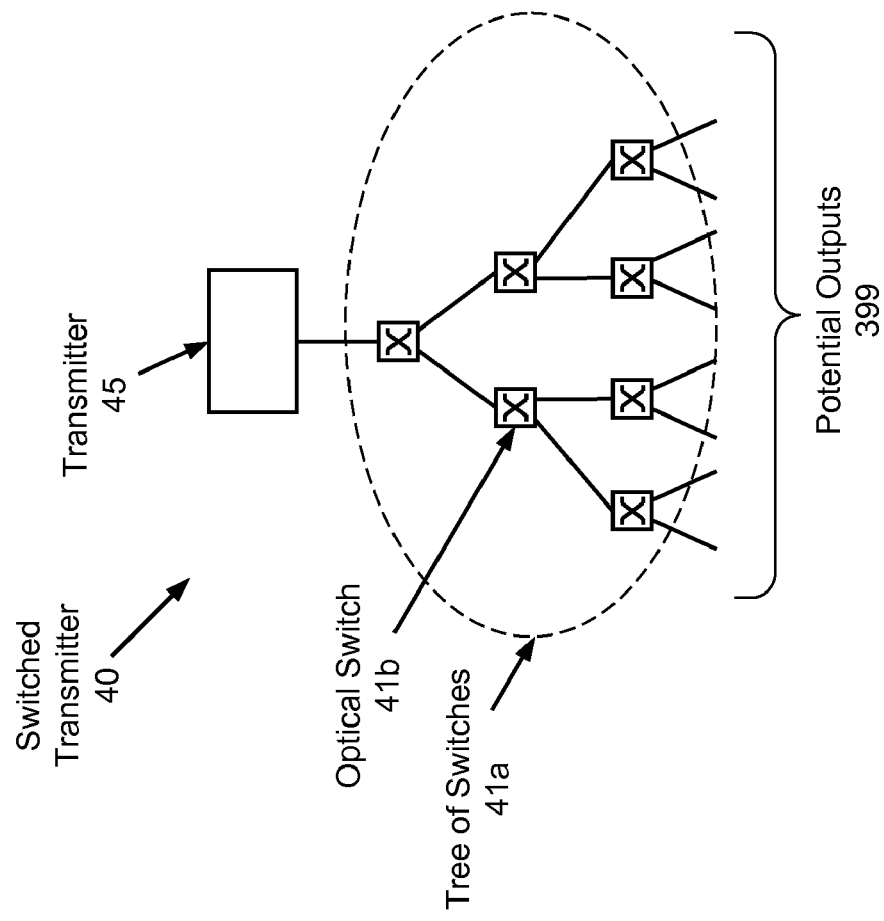
FIG. 3B shows a switched transmitter in accordance with one or more embodiments of the invention.
Figure 3A:
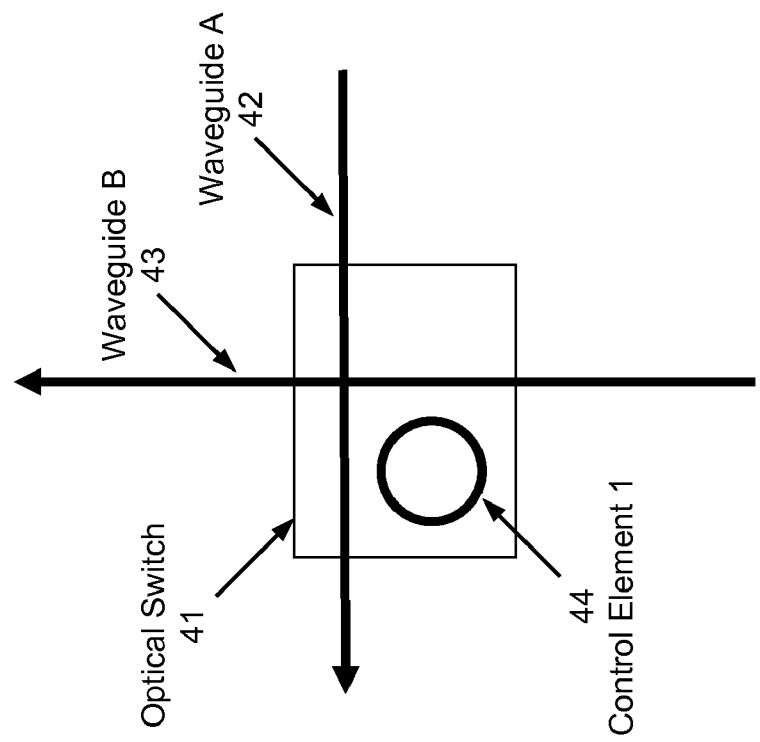
FIG. 3A shows an optical switch in accordance with one or more embodiments of the invention.

FIG. 3A shows an optical switch (41) in accordance with one or more embodiments of the invention. The optical switch (41) may be used as the input switches and/or the output switches discussed above in reference to FIG. 1 and FIG. 2. Further, multiple optical switches may be used to build the switched transmitter (40).

As shown in FIG. 3A, the optical switch (41) includes a control element 1 (44) disposed adjacent to a junction of waveguides (i.e., Waveguide A (42) and Waveguide B (43)). The waveguides (i.e., Waveguide A (42) and Waveguide B (43)) are depicted as a vertical arrow and a horizontal arrow where optical signals propagate along the direction of the arrows. Specifically, an arrow head denotes a downstream direction of the optical signal propagation.

In a default state, when no control signal (e.g., voltage signal) is applied to the control element 1 (44) (i.e., the optical switch (41) is deactivated), optical signals travel along the waveguide A (42) without interruption. However, when a control signal is applied to the control element 1 (44) (i.e., the optical switch (41) is activated), optical signals traveling along the waveguide B (43) are switched (i.e., diverted) to the waveguide A (42). Generally speaking, optical signal sources (e.g., sending nodes) connected to the upstream of the waveguide A (42) are deactivated (e.g., based on an arbitration network noted above) when the optical switch (41) is activated.

In one or more embodiments of the invention, the optical switch (41) is used for the output switches, discussed above in reference to FIG. 1 and FIG. 2. In such embodiments, the control signal may be applied by a sending node operatively connected to the optical switch (41) and located on the upstream end of the waveguide B (43). Further, the control signal may be applied to activate the optical switch (41) for a timeslot. Finally, the waveguide A (42) may correspond to a horizontal optical data link, discussed above in reference to FIG. 1 and FIG. 2. A sending node may be connected to the upstream of the waveguide B (43).

In one or more embodiments of the invention, the optical switch (41) is used as the input switches, discussed above in reference to FIG. 1 and FIG. 2. In such embodiments, the control signal may be applied by a receiving node operatively connected to the optical switch (41) and located on the downstream end of waveguide A (42). Finally, the upstream portions of waveguide A (42) and waveguide B (43) may correspond to the two waveguide segments in a vertical waveguide, discussed above in reference to FIG. 1 and FIG. 2.

FIG. 3B shows a switched transmitter (40) in accordance with one or more embodiments of the invention. The switched transmitter (40) may be essentially the same as the switched transmitter (19), discussed above in reference to FIG. 1. As shown in FIG. 3B, the switched transmitter (40) is built using multiple optical switches (e.g., Optical Switch (41b)). Moreover, each optical switch may be essentially the same as the optical switch (41) discussed above in reference to FIG. 3A. Specifically, the upstream end of the waveguide B (43) is the input of the optical switch (41b) of the tree of switches (41a), while the downstream end of waveguide A (42) and the downstream end of waveguide B (43) are the outputs of the optical switch (41b). By applying (or not applying) a control signal to each optical switch in the tree of switches (41a), an optical signal provided by the transmitter (45) may be directed to any of the potential outputs (399). As discussed above, the control signal may change for different timeslots.

Figure 4:
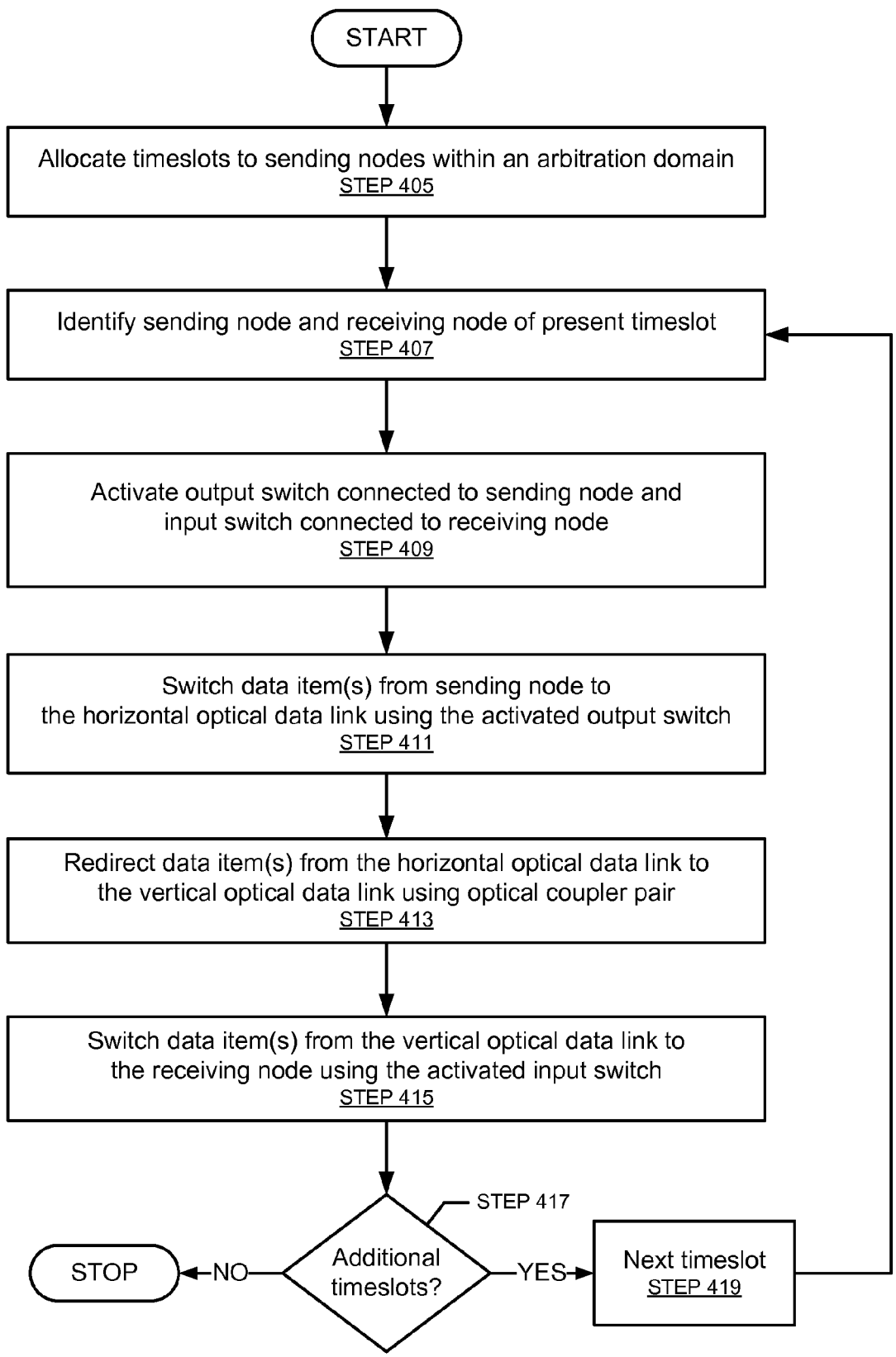
FIG. 4 shows a flowchart in accordance with one or more embodiments of the invention.

FIG. 4 shows a flowchart in accordance with one or more embodiments of the invention. The process depicted in FIG. 4 may be implemented using the system (10) described in reference to FIG. 1 above. With a few minor modifications, the process depicted in FIG. 4 may also be implemented using the system (20). The process depicted in FIG. 4 may pertain to a single arbitration domain (e.g., a node row/receiving node pair) within the system (10). The steps shown in FIG. 4 may be omitted, repeated, and/or performed in a different order. Accordingly, embodiments of the invention should not be considered limited to the specific arrangements of steps shown in FIG. 4.

Initially, upcoming timeslots are allocated to the sending nodes of the arbitration domain (STEP 405). As discussed above, the allocation of timeslots is the result of arbitration among the sending nodes. As also discussed above, more details regarding arbitration and the allocation of timeslots may be found in U.S. patent application Ser. No. 12/688,749, filed on Jan. 15, 2010, and entitled: "Time Division Multiplexing Based Arbitration For Shared Optical Links"; and U.S. patent application Ser. No. 12/610,124, filed on Oct. 30, 2009, and entitled: "Two-Phase Arbitration Mechanism for Shared Optical Links." Both patent applications are incorporated herein by reference.

In STEP 407, the sending node and the receiving node assigned to the present timeslot are identified. The sending node may have one or more data items for transmission to the receiving node. The sending node may be located in a node row of a node array, while the receiving node may be located in a node column of the node array. Moreover, as shown in FIG. 1, the sending node and the receiving node may be connected by an optical data channel having a horizontal optical data link, a vertical optical data link, and an optical coupler pair connecting said horizontal and vertical optical data links. As also shown in FIG. 1, the sending node is operatively connected to the optical data channel (i.e., the horizontal optical data link) by an output switch, while the receiving node is operatively connected to the optical data channel (i.e., the vertical optical data link) by an input switch.

In STEP 409, the output switch operatively connecting the sending node and the horizontal optical data link of the optical data channel is activated for the present timeslot. The output switch may be controlled (i.e., activated/deactivated) by the sending node. Further, the input switch operatively connecting the receiving node and the vertical optical data link of the optical data channel is activated for the present timeslot. The input switch may be controlled (i.e., activated/deactivated) by the receiving node. In one or more embodiments of the invention, the input switches and the output switches that are connected to the optical data channel but not to the sending node or the receiving node are deactivated for the timeslot.

In STEP 411, one or more optical signals carrying/representing data items for transmission are generated/provided by the sending node and switched to the horizontal optical data link (i.e., a waveguide segment) by the activated output switch. As discussed above in reference to FIG. 3A, the switching (i.e., diverting) of the optical signals is the result of activating the output switch (i.e., applying a control signal to the output switch).

In STEP 413, the one or more optical signals carrying/representing data items for transmission are redirected from the horizontal optical data link to the vertical optical data link of the optical data channel using at least one optical coupler of the optical coupler pair.

In STEP 415, the one or more optical signals carrying/representing data items for transmission are switched from the vertical optical data link (e.g., a waveguide segment) to the receiving node using the activated input switch. As discussed above in reference to FIG. 3, the switching (i.e., diverting) of the optical signals is the result of activating the input switch (i.e., applying a control signal to the input switch).

In STEP 417, it is determined whether additional timeslots exist. When it is determined that additional timeslots exist, the process advances to the next timeslot (STEP 419), and returns to STEP 407. When it is determined no additional timeslots exist, the process ends. In one or more embodiments of the invention, the process may proceed to STEP 419 immediately after executing STEP 415 (i.e., STEP 417 is omitted).

In view of FIG. 1, during a given timeslot, multiple sending nodes within the same node row may transmit data items to different receiving nodes, even if the different receiving nodes are located within the same node column. In other words, during the execution of the steps in FIG. 4, a sending node other than the sending node mentioned in STEP 407 but located in the same node row may transmit data items to a receiving node other than the receiving node mention in STEP 407, even if the two receiving nodes are in the same node column.

As mentioned above, the steps depicted in FIG. 4 are illustrated using the architecture of the system (10), discussed above in reference to FIG. 1. As also discussed above, the process depicted in FIG. 4, following a few minor modification, may be implemented using the architecture of the system (20), discussed above in reference to FIG. 2. Specifically, as the architecture of the system (20) includes extra optical receivers and electronic buffering circuits within each receiving node instead of the input switch, there is no need to identify and/or activate the input switch as done in STEP 409 and STEP 415. In such embodiments, two separate sending nodes located in the same node row but connected to separate waveguide segments may send data item(s) to the same receiving node during the same timeslot mentioned in STEP 405.

Figure 5:
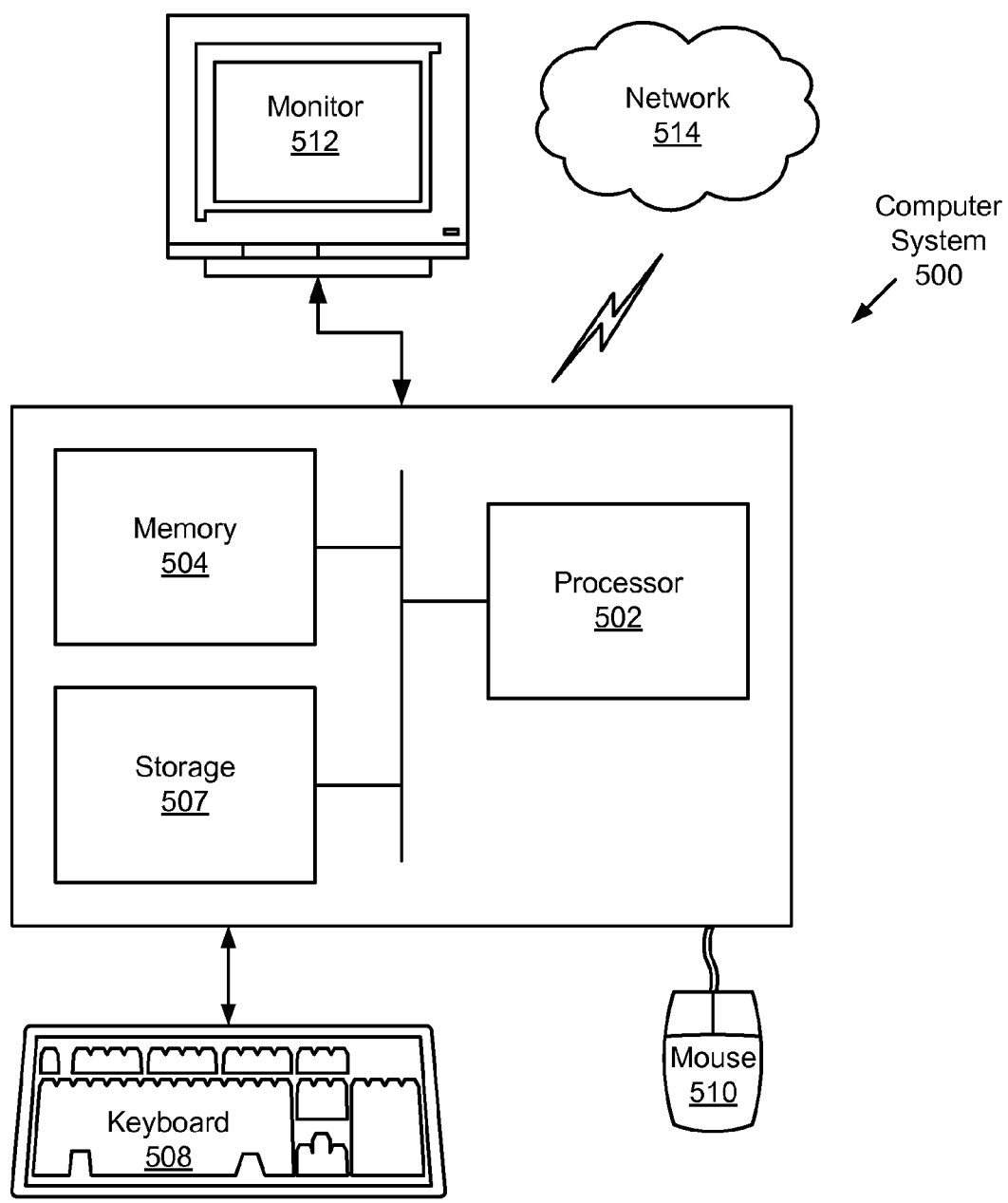
FIG. 5 shows a computer system in accordance with one or more embodiments of the invention.

FIG. 5 shows a computer system (500) in accordance with one or more embodiments of the invention. One or more portions of the invention may be a component in the computer system (500) (e.g., an integrated circuit in the computer system (500)). As shown in FIG. 5, the computer system (500) includes a processor (502), associated memory (504), a storage device (507), and numerous other elements and functionalities typical of today's computers (not shown). One or more portions of the invention may include a component in the computer system (500) (e.g., the processor (502), the memory (504), etc.). The computer system (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms, now known or later developed. Further, those skilled in the art will appreciate that one or more elements of the aforementioned computer system (500) may be located at a remote location and connected to the other elements over a network.

One or more embodiments of the invention exhibit one or more of the following advantages. The system and method disclosed herein may increase the point-to-point bandwidth between any two nodes in the node array of a macro-chip (e.g., used in large scale symmetric multi-processing (SMP) systems) over that of a static WDM point to point scheme under the same power and area constraints. Further, the system and method disclosed herein may increase parallelism in data transfers based on multiple shared domains without enlarging the network topology.

The properties of optical waveguides such as low latency, high bit-rate, and wavelength division multiplexing (WDM) (i.e., sending multiple wavelengths through a single waveguide) may be utilized in a silicon photonic optical network to exceed the performance of an electronic data network having metal or alloy traces. The design of a photonic optical network must consider:

(1) Number of waveguides, which determines the substrate area consumed by the optical data interconnects.

(2) Number of lasers, modulators and receivers (e.g., photo-detectors), which determines the required optical power and complexity.

(3) Number of outputs from a waveguide, which determines the amount of source power at a given bit-rate.

(4) Number of input sources to a certain wavelength in a waveguide, which may dictate the use of optical switches, which increases complexity and contributes towards power loss.

(5) Number of optical to electrical conversions, which is desirable to be minimized.

(6) Sharing interconnect links to provide high bandwidth between two points in a network with the trade-off of contention induced bandwidth limitation.

(7) Maximum number of optical switches traversed in a single optical data link. There can be only one direct input to a wavelength in a waveguide. In the case of multiple inputs, optical switches must be used. Switches increase complexity and contribute to power loss. The maximum number of switches that an optical signal goes through in each optical data link determines the input power required for that link.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A system comprising:
   a first sending node comprising a first data item for transmission to a receiving node during a first timeslot;
   a second sending node comprising a second data item for transmission to the receiving node during a second timeslot, wherein the first and second sending nodes are located within a node row of a node array;
   a horizontal optical data link (ODL) comprising a first waveguide segment and a second waveguide segment, wherein the first and second waveguide segments propagate optical signals in opposite directions;
   a vertical ODL coupled to the receiving node and comprising a third waveguide segment and a fourth waveguide segment, wherein the third and fourth waveguide segments propagate optical signals in the same direction;
   a first optical output switch operatively connecting the first sending node and the first waveguide segment and configured to switch the first data item onto the first waveguide segment during the first timeslot;
   a second optical output switch operatively connecting the second sending node and the second waveguide segment and configured to switch the second data item onto the second waveguide segment during the second timeslot; and
   an optical coupler pair operatively connecting the first and second waveguide segments to the third and fourth waveguide segments, respectively, wherein the optical coupler pair redirects the first data item and the second data item from the horizontal ODL to the vertical ODL.

2. The system of claim 1, wherein the receiving node comprises an optical receiver for receiving the first data item and the second data item from the vertical ODL.

3. The system of claim 2, further comprising:
   an optical input switch operatively connecting the optical receiver in the receiving node with the third waveguide segment and the fourth waveguide segment of the vertical ODL.

4. The system of claim 3, wherein the optical input switch is configured to:
   switch the first data item from the third waveguide segment to the optical receiver during the first timeslot, wherein the first output switch is deactivated for the second timeslot; and
   switch the second data item from the fourth waveguide segment to the optical receiver during the second timeslot, wherein the second output switch is deactivated for the first timeslot.

5. The system of claim 1, further comprising an arbitration network operatively connected to the first sending node, the second sending node, and the receiving node, and configured to allocate the first timeslot to the first sending node and allocate the second timeslot to the second sending node.

6. The system of claim 1, wherein the node array comprising the first sending node, the second sending node, and the receiving node is disposed on a single macro-chip.

7. The system of claim 6, wherein each node of the node array is associated with one vertical ODL dedicated for receiving data items from only one horizontal ODL.

8. The system of claim 6, wherein each node of the node array is associated with one horizontal ODL dedicated for sending data items to only one node in the node array.

9. The system of claim 6, wherein each node of the node array comprises a switched transmitter operatively connected to a plurality of output switches each dedicated for sending data items to only one node in the node array.

10. A method for optical data communication, comprising:
allocating a first timeslot to a first sending node in an arbitration domain and a second timeslot to a second sending node in the arbitration domain;
switching, using a first output switch associated with the first sending node, a first data item from the first sending node onto a first waveguide segment of a first optical data link (ODL) during the first timeslot;
redirecting, using an optical coupler pair, the first data item from the first waveguide segment of the first ODL to a first waveguide segment of a second ODL operatively coupled to a receiving node;
receiving, by the receiving node during the first timeslot, the first data item from the first waveguide segment of the second ODL; and
deactivating the first output switch for the second timeslot, wherein optical signals propagate in opposite directions in the first waveguide segment and a second waveguide segment of the first ODL, and
wherein optical signals propagate in same direction in the first waveguide segment and a second waveguide segment of the second ODL.

11. The method of claim 10, further comprising:
switching, using a second output switch associated with the second sending node, a second data item from the second sending node onto the second waveguide segment of the first ODL during the second timeslot;
redirecting, using the first optical coupler pair, the second data item from the second waveguide segment of the first ODL to the second waveguide segment of the second ODL; and
receiving, by the receiving node during the second timeslot, the second data item from the second waveguide segment of the second ODL.

12. The method of claim 11, further comprising:
activating an input switch operatively connecting the first waveguide segment of the second ODL and the second waveguide segment of the second ODL with the receiving node.

13. The method of claim 11, further comprising:
deactivating an input switch operatively connecting the first waveguide segment of the second ODL and the second waveguide segment of the second ODL with the receiving node.

14. A system comprising:
a first sending node comprising a first data item for transmission to a receiving node during a first timeslot;
a second sending node comprising a second data item for transmission to the receiving node during a second timeslot, wherein the first and second sending nodes are located within a node row of a node array;
a horizontal optical data link (ODL) operatively coupled to a vertical ODL, wherein the vertical ODL is operatively coupled to the receiving node;
a first optical output switch operatively connecting the first sending node and the horizontal ODL and configured to switch the first data item onto the horizontal ODL during the first timeslot;
a second optical output switch operatively connecting the second sending node and the horizontal ODL and configured to switch the second data item onto the horizontal ODL during the second timeslot; and
an optical coupler operatively connecting the horizontal ODL and the vertical ODL, wherein the optical coupler redirects the first data item and the second data item from the horizontal ODL to the vertical ODL.

15. The system of claim 14, wherein the receiving node comprises a first optical receiver and a second optical receiver for receiving the first data item and the second data item, respectively, from the vertical ODL.

16. The system of claim 14, further comprising an arbitration network operatively connected to the first sending node and the second sending node, and configured to allocate the first timeslot to the first sending node and allocate the second timeslot to the second sending node.

17. The system of claim 14, wherein the node array comprising the first sending node, the second sending node, and the receiving node is disposed on a single macro-chip.

18. The system of claim 14, wherein each node of the node array is associated with one vertical ODL dedicated for receiving data items from only one horizontal ODL.

19. The system of claim 14, wherein each node of the node array is associated with one horizontal ODL dedicated for sending data items to only one node in the node array.

20. The system of claim 14, wherein each node of the node array comprises a switched transmitter operatively connected to a plurality of output switches each dedicated for sending data items to only one node in the node array.

* * * * *

UNITED STATES PATENT AND TRADEMARK OFFICE
CERTIFICATE OF CORRECTION

PATENT NO. : 8,285,140 B2
APPLICATION NO. : 12/723591
DATED : October 9, 2012
INVENTOR(S) : McCracken et al.

Page 1 of 1

It is certified that error appears in the above-identified patent and that said Letters Patent is hereby corrected as shown below:

On page 2, in column 1, under "Other Publications", line 7, delete "Vul. 97," and insert -- Vol. 97, --, therefor.

On page 2, in column 2, under "Other Publications", line 2, delete "Optival" and insert -- Optical --, therefor.

On sheet 1 of 5, in figure 1, Reference Numeral 15a, line 1, delete "Horiontal" and insert -- Horizontal --, therefor.

Signed and Sealed this
Eighth Day of January, 2013

David J. Kappos
*Director of the United States Patent and Trademark Office*